(12) United States Patent
Kwon et al.

(10) Patent No.: US 9,529,231 B2
(45) Date of Patent: Dec. 27, 2016

(54) LIQUID CRYSTAL DISPLAY

(71) Applicant: Samsung Display Co., Ltd., Yongin (KR)

(72) Inventors: Oh Jeong Kwon, Hwaseong-si (KR); Hyeok Jin Lee, Seongnam-si (KR); Dong-Chul Shin, Seoul (KR); Jae Hong Park, Seoul (KR); Sung-Jae Yun, Hwaseong-si (KR); Ki Chul Shin, Seongnam-si (KR); Seung Wook Nam, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 263 days.

(21) Appl. No.: 14/257,460

(22) Filed: Apr. 21, 2014

(65) Prior Publication Data

US 2015/0055040 A1 Feb. 26, 2015

(30) Foreign Application Priority Data

Aug. 26, 2013 (KR) ........................ 10-2013-0101133

(51) Int. Cl.
    *G02F 1/1343* (2006.01)
    *G02F 1/1337* (2006.01)
(52) U.S. Cl.
    CPC .............. *G02F 1/133707* (2013.01); *G02F 2001/134345* (2013.01)
(58) Field of Classification Search
    CPC .............. G02F 1/133707; G02F 2001/134318; G02F 2001/134345; G02F 1/134309; G02F 1/133753; G02F 2001/133757; G02F 2001/133761; G02F 1/133377; G02F 2201/122; G02F 2201/123; G02F 2001/133726
    (Continued)

(56) References Cited

U.S. PATENT DOCUMENTS 6,300,996 B1   10/2001   Matsuyama et al.
6,801,286 B2   10/2004   Yamaguchi et al.
(Continued)

FOREIGN PATENT DOCUMENTS

JP    2009-080197    4/2009
KR    10-0289535    6/2001
(Continued)

*Primary Examiner* — Huyen Ngo
(74) *Attorney, Agent, or Firm* — H.C. Park & Associates, PLC

(57) ABSTRACT

The present invention relates to a liquid crystal display that can improve an aperture ratio and liquid crystal control ability. A liquid crystal display according to an exemplary embodiment of the present invention includes: a first substrate and a second substrate which face each other; a pixel electrode disposed on the first substrate; a common electrode disposed on the second substrate; and a liquid crystal layer disposed between the first substrate and the second substrate, in which the common electrode has a first cutout having a cross shape, and the pixel electrode includes a first subpixel electrode having a rhombus shape, a second subpixel electrode surrounding the first subpixel electrode, a second cutout disposed close to and along at least one of the edges of the second subpixel electrode, and a third cutout spacing the first subpixel electrode and the second subpixel electrode.

20 Claims, 18 Drawing Sheets

(58) Field of Classification Search
USPC .................................................. 349/144–146
See application file for complete search history.

(56) References Cited

U.S. PATENT DOCUMENTS

| | | | |
|---|---|---|---|
| 7,714,966 B2 | 5/2010 | Ishii | |
| 7,728,938 B2 | 6/2010 | Chang et al. | |
| 8,054,426 B2 | 11/2011 | Choi et al. | |
| 8,467,004 B2* | 6/2013 | Nagata | G02F 1/134309 |
| | | | 345/173 |
| 2006/0044501 A1 | 3/2006 | Mizusako | |
| 2011/0037932 A1 | 2/2011 | Takahashi | |
| 2012/0147302 A1 | 6/2012 | Nakagawa et al. | |
| 2012/0229739 A1 | 9/2012 | Inoue et al. | |
| 2014/0016074 A1* | 1/2014 | Yonekura | G02F 1/134336 |
| | | | 349/141 |
| 2014/0253855 A1* | 9/2014 | Yang | G02F 1/133377 |
| | | | 349/138 |

FOREIGN PATENT DOCUMENTS

| | | |
|---|---|---|
| KR | 10-2008-0022355 | 3/2008 |
| KR | 10-2008-0100642 | 11/2008 |
| KR | 10-2012-0082472 | 7/2012 |
| KR | 10-2012-0124012 | 11/2012 |

\* cited by examiner

LIQUID CRYSTAL DISPLAY

CROSS-REFERENCE TO RELATED APPLICATION

This application claims priority from and the benefit of Korean Patent Application No. 10-2013-0101133, on Aug. 26, 2013, which is hereby incorporated by reference for all purposes as if fully set forth herein.

BACKGROUND

Field

Exemplary embodiments of the present invention relate to a liquid crystal display, and more particularly, to a liquid crystal display that can improve the ability of controlling an aperture ratio and liquid crystal.

Discussion of the Background

Liquid crystal displays (LCDs), a type of flat panel displays that is currently among the most widely used, typically includes two display panels with field generating electrodes disposed thereon, such as pixel electrodes and common electrodes, and a liquid crystal layer between the panels. Liquid crystal displays display an image by generating an electric field in the crystal layer. This electric field is generated by applying voltage to the field generating electrodes so that the direction of the liquid crystal molecules in the liquid crystal layer is controlled, and then controlling polarization of incident light.

In liquid crystal displays, a "vertically aligned (VA) mode" liquid crystal display has been developed. This is a display in which liquid crystal molecules are arranged with long axes perpendicular to the display panel when an electric field is not applied.

In the VA mode liquid crystal display, it is beneficial to ensure a wide viewing angle. For this purpose, a method of forming a cutout such as a fine slot on a field generating electrode is typically used. Since a cutout and a protrusion determine the tilt direction of liquid crystal molecules, the viewing angle may be increased by distributing the tilt direction of the liquid crystal molecules in various directions by appropriately arranging the liquid crystal molecules.

However, in the method of providing a plurality of branch electrodes by forming a fine slit on a pixel electrode, the aperture ratio of the liquid crystal display decreases.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display having advantages of a wide viewing angle and a high response speed while simultaneously improving the aperture ratio of a liquid crystal display.

Exemplary embodiments of present invention also provide a liquid crystal display that may increase the liquid crystal control ability and improve visibility.

Additional features of the invention will be set forth in the description which follows, and in part will be apparent from the description, or may be learned by practice of the invention.

An exemplary embodiment of the present invention discloses a liquid crystal display including: a first substrate and a second substrate which face each other; a pixel electrode disposed on the first substrate; a common electrode disposed on the second substrate; and a liquid crystal layer disposed between the first substrate and the second substrate, in which the common electrode has a first cutout having a cross shape, and the pixel electrode includes a first subpixel electrode having a rhombus shape, a second subpixel electrode surrounding the first subpixel electrode, a second cutout disposed close to and along at least one of the edges of the second subpixel electrode, and a third cutout spacing the first subpixel electrode and the second subpixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
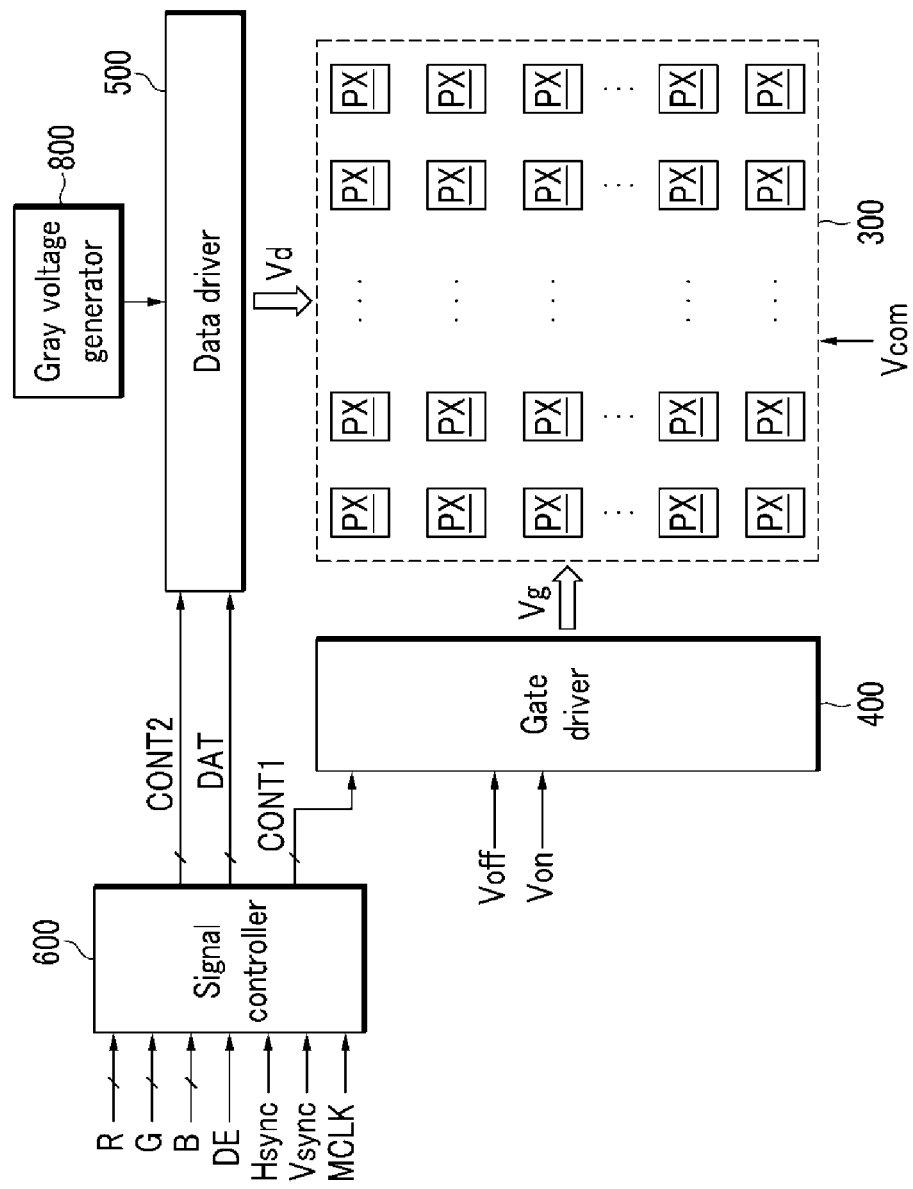
FIG. 1 is a block diagram of a liquid crystal display according to an exemplary embodiment of the present invention.

The present invention will be described more fully hereinafter with reference to the accompanying drawings, in which exemplary embodiments of the invention are described. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display according to an exemplary embodiment of the present invention will be described with reference to the accompanying drawings.

Figure 2:
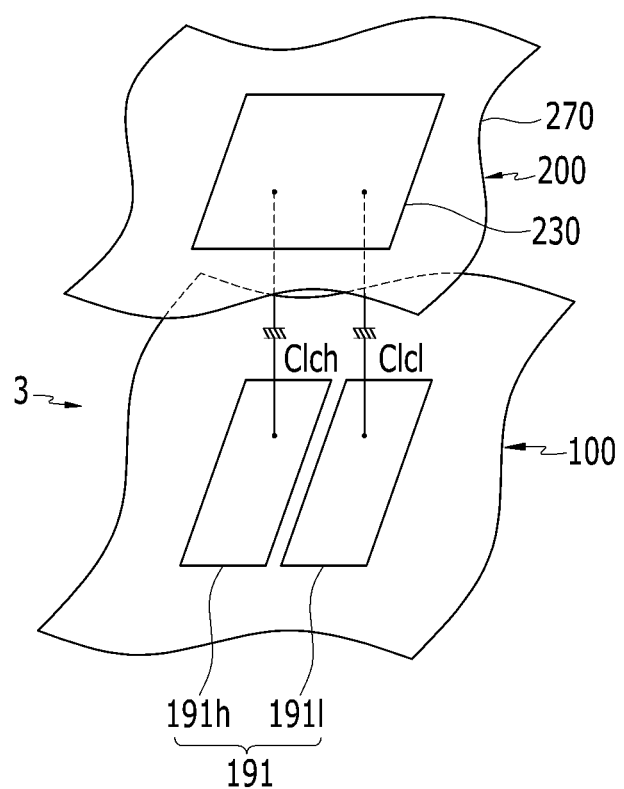
FIG. 2 is an equivalent circuit diagram illustrating one pixel with the structure of the liquid crystal display illustrated in FIG. 1.

FIG. 1 is a block diagram of a liquid crystal display according to an exemplary embodiment of the present invention, and FIG. 2 is an equivalent circuit diagram illustrating one pixel with the structure of a liquid crystal display illustrated in FIG. 1.

As illustrated in FIG. 1, a liquid crystal display according to an exemplary embodiment of the present invention includes a liquid crystal panel assembly 300. The liquid crystal display also may include a gate driver 400 and a data driver 500 connected to the liquid crystal panel assembly 300, a gray voltage generator 800 connected to the data driver 500, and a signal controller 600 configured to control the components.

The liquid crystal panel assembly 300 includes a plurality of signal lines (not illustrated) and a plurality of pixels PX connected with the signal lines and arranged in a matrix on an equivalent circuit. FIG. 2 illustrates the liquid crystal panel assembly 300 further including a lower panel 100 and an upper panel 200 facing each other and a liquid crystal layer 3 disposed therebetween.

The signal lines include a plurality of gate lines (not illustrated) transmitting gate signals (also called "scanning signals") and a plurality of data lines (not illustrated) transmitting data voltages. The gate lines extend in the row direction substantially parallel with each other, and the data lines extend in the column direction substantially parallel with each other.

Each of the pixels PX may include a pair of subpixels. The subpixels respectively include liquid crystal capacitors Clch and Clcl. At least one of two subpixels may include a switching element (not illustrated) connected with each of the gate line, the data line, and the liquid crystal capacitors Clch and Clcl.

The liquid crystal capacitors Clch and Clcl have first and second subpixel electrodes 191h and 191l disposed on the lower panel 100, respectively, as one terminal, and a common electrode 270 disposed on the upper panel 200 as a second terminals. The liquid crystal layer 3 disposed between the first and second subpixel electrodes 191h and 191l and the common electrode 270 functions as a dielectric material. The first and second subpixel electrodes 191h and 191l are separated from each other, and constitute one pixel electrode 191. The common electrode 270 may be formed on the front of the upper panel 200 and receives a common voltage Vcom. The liquid crystal layer 3 may have negative dielectric anisotropy.

In order to implement color display, the pixels PX may each display a unique color in the primary colors (spatial division). The pixels PX may further each display the primary colors in accordance with time (temporal division) so that desired colors are recognized by spatial and temporal combination of the primary colors. The primary colors, for example, may be the three primary colors of red, green, and blue. FIG. 2 illustrates, as an example of spatial division, that each of the pixels PX includes a color filter 230 exhibiting one of the primary colors in the region of the upper panel 200. Alternatively or additionally to the embodiment illustrated in FIG. 2, the color filter 230 may be disposed above or under the first and second subpixels 191h and 191l of the lower panel 100.

At least one polarizer (not illustrated) polarizing light may be attached to the outer side of the liquid crystal panel assembly 300.

Referring to FIG. 1 again, the gray voltage generator 800 generates the entire gray voltage relating to transmittance of the pixels PX or an amount of gray voltage (hereafter, referred to as "reference gray voltage"). The reference gray voltage may include a voltage having a positive value and a voltage having a negative voltage for the common voltage Vcom.

The gate driver 400 may be connected to the gate line of the liquid crystal panel assembly 300 and may send a gate signal Vg including a combination of a gate-on voltage Von and a gate-off voltage Voff to the gate line.

The data driver 500, which is connected to the data line of the liquid crystal panel assembly 300, selects a gray voltage from the gray voltage generator 800, and sends the gray voltage as a data voltage Vd to the data line. However, when the gray voltage generator 800 provides only a number of reference gray voltages, not voltages for all grays, the data driver 500 generates gray voltages for all grays by dividing the reference gray voltage and selects a data voltage from the gray voltages.

The drivers 400, 500, 600, and 800 may be mounted directly on the liquid crystal panel assembly 300 or on at least one IC chip type flexible printed circuit film (not illustrated) that may be attached to the liquid crystal panel assembly 300. Alternatively, drivers 400, 500, 600, and 800 may be mounted on a TCP (Tape Carrier Package) type specific printed circuit board (not illustrated). Alternatively, the drivers 400, 500, 600, and 800 may be integrated on the liquid crystal panel assembly 300, together with signal lines and switching elements. Alternatively, the drivers 400, 500, 600, and 800 may be integrated in a signal chip, in which at least one of the drivers or at least one circuit element of the drivers may be disposed outside the signal chip.

The liquid crystal display according to an exemplary embodiment of the present invention will be described hereafter in more detail with reference to FIGS. 1, 2, and 3 to 9.

Figure 3:
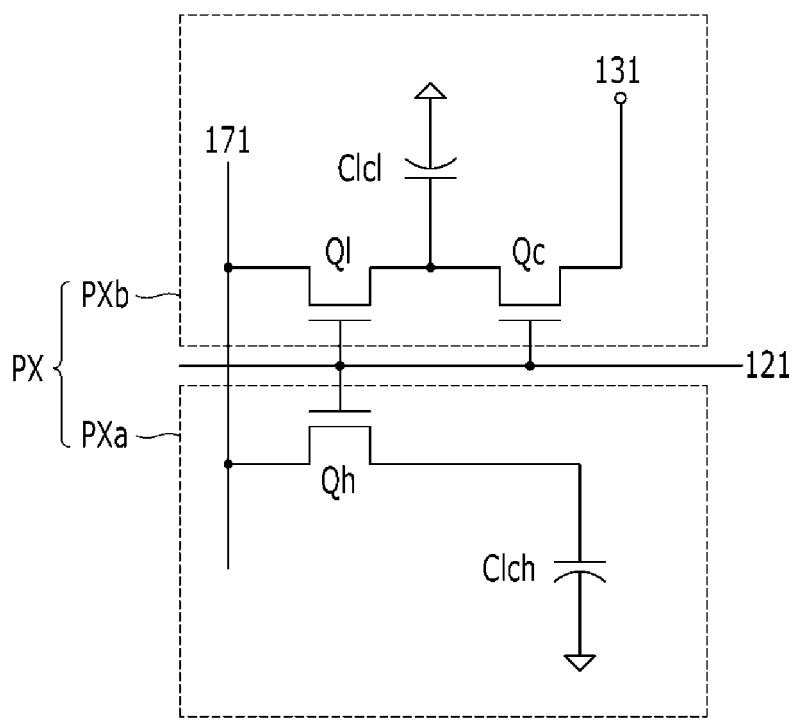
FIG. 3 is an equivalent circuit diagram of one pixel of a liquid crystal display according to an exemplary embodiment of the present invention.
Figure 4:
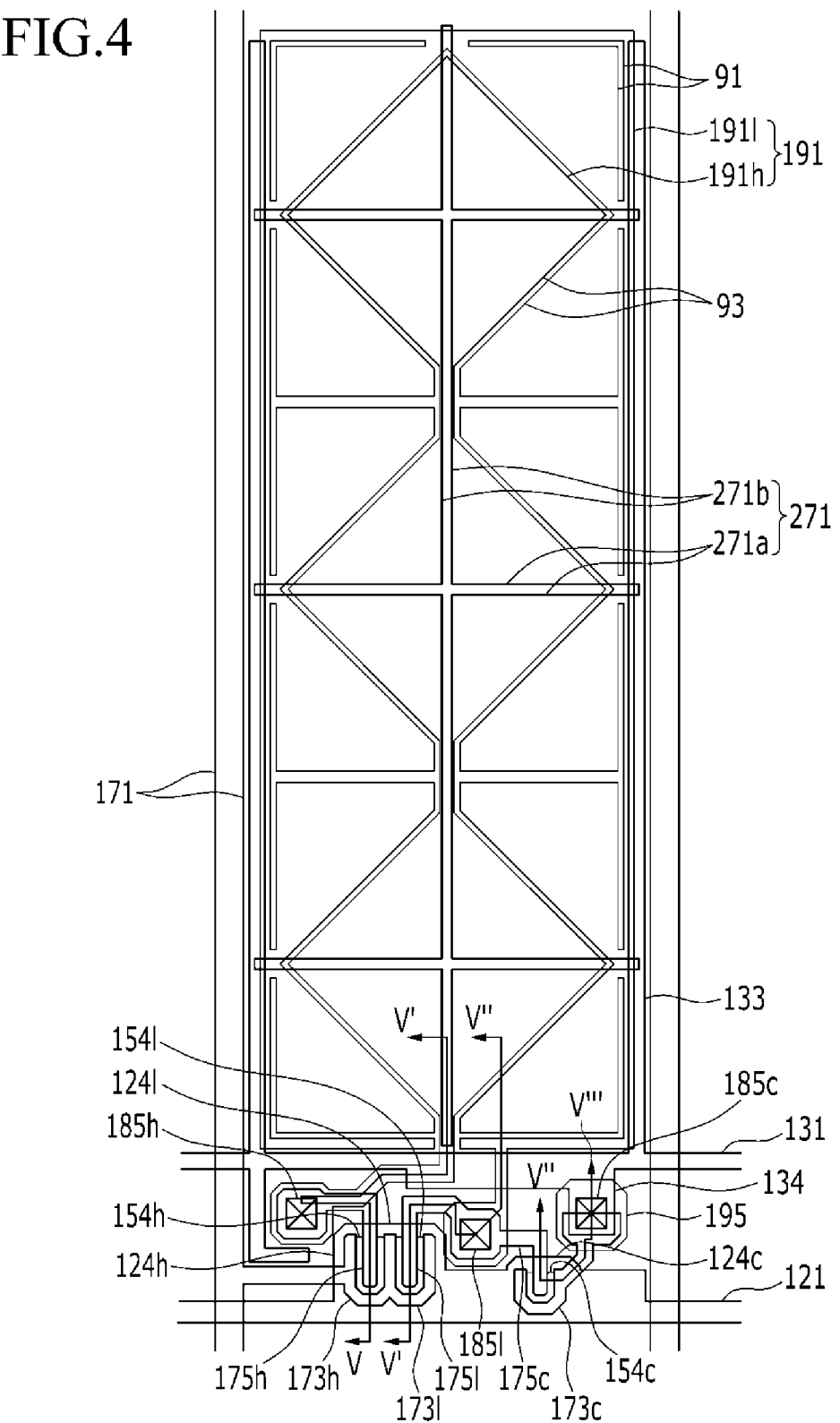
FIG. 4 is a top plan view of one pixel of a liquid crystal display according to an exemplary embodiment of the present invention.
Figure 5:
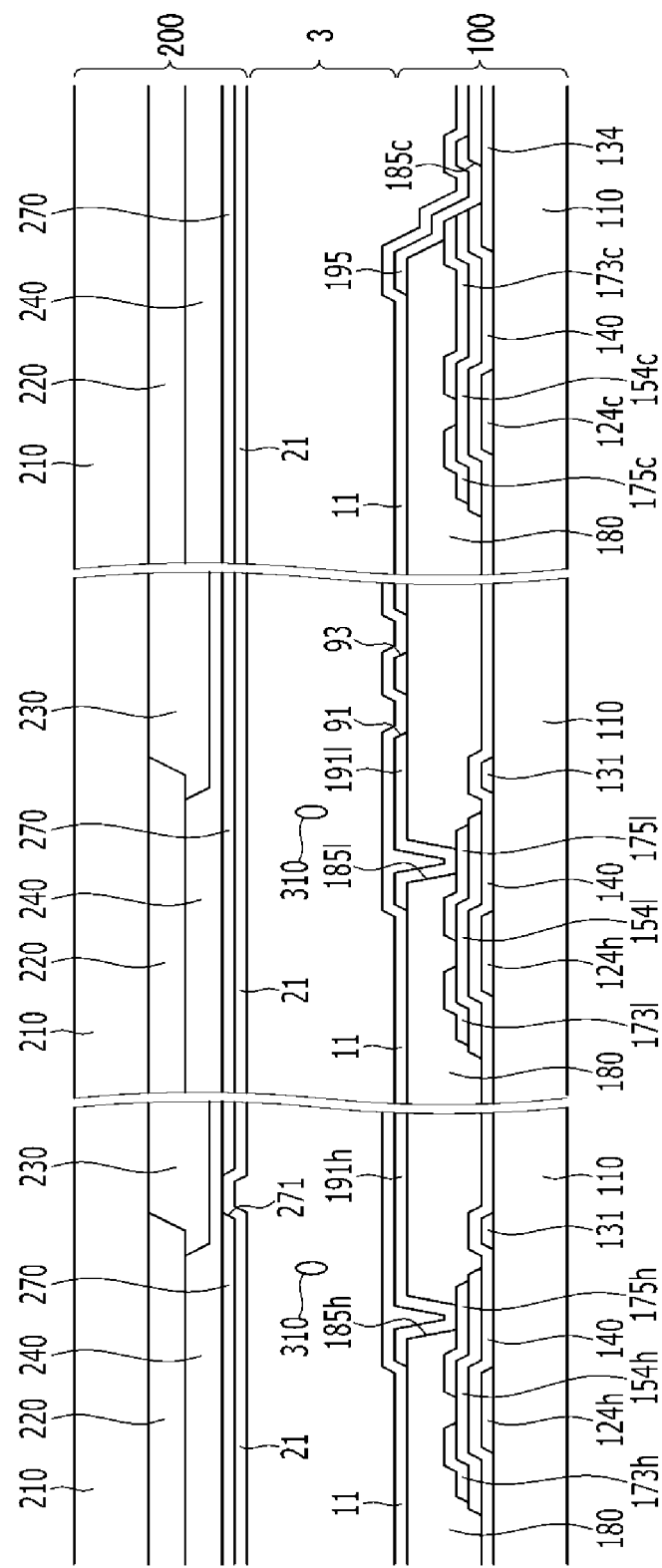
FIG. 5 is a cross-sectional view of a liquid crystal display according to an exemplary embodiment of the present invention, taken along lines V-V', V'-V'', and V''-V''' of FIG. 4.
Figure 6:
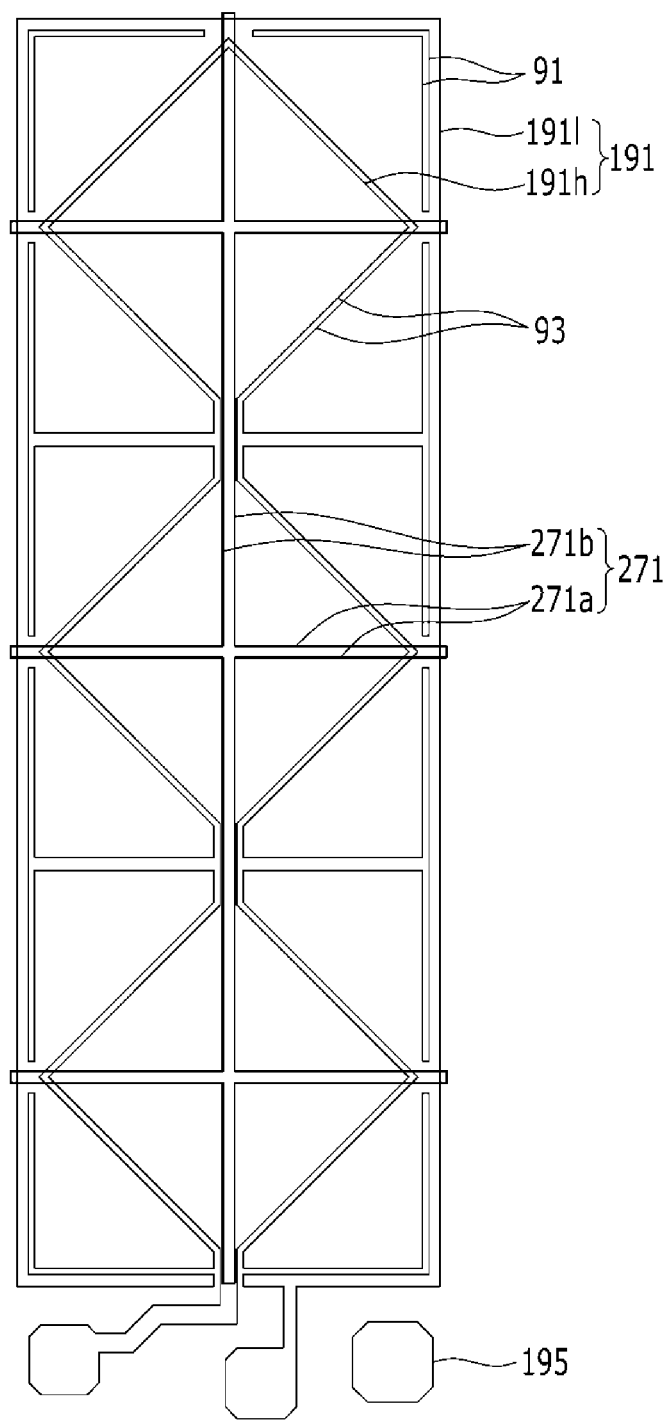
FIG. 6 is a top plan view illustrating a first cutout of a common electrode and a pixel electrode of one pixel of a liquid crystal display according to an exemplary embodiment of the present invention.
Figure 7:
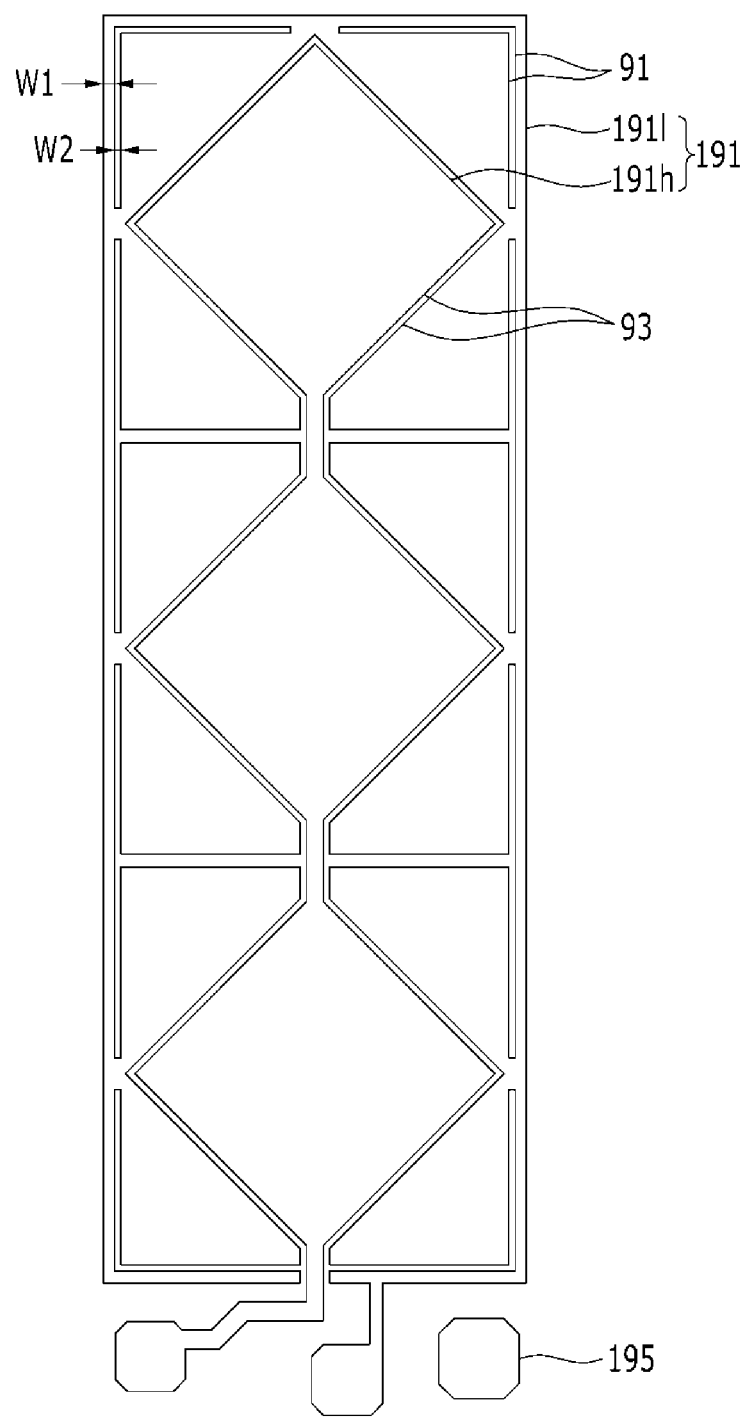
FIG. 7 is a top plan view illustrating only the pixel electrode of FIG. 6.
Figure 8:
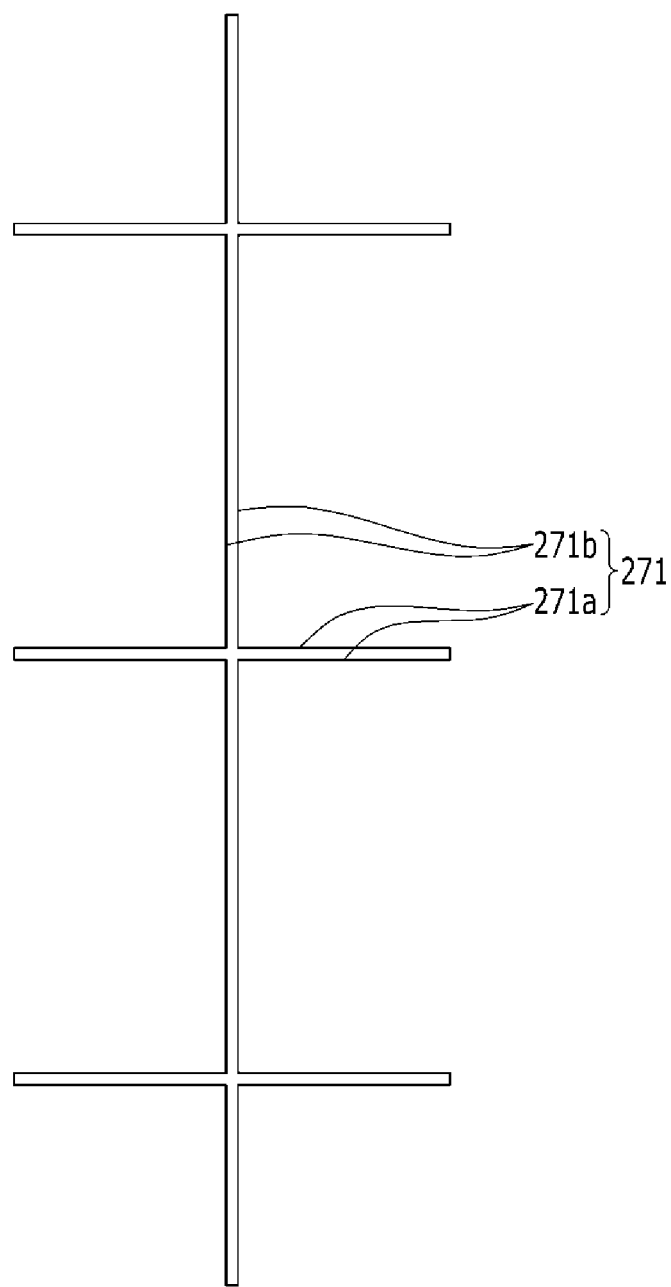
FIG. 8 is a top plan view illustrating only the first cutout of the common electrode of FIG. 6.
Figure 9:
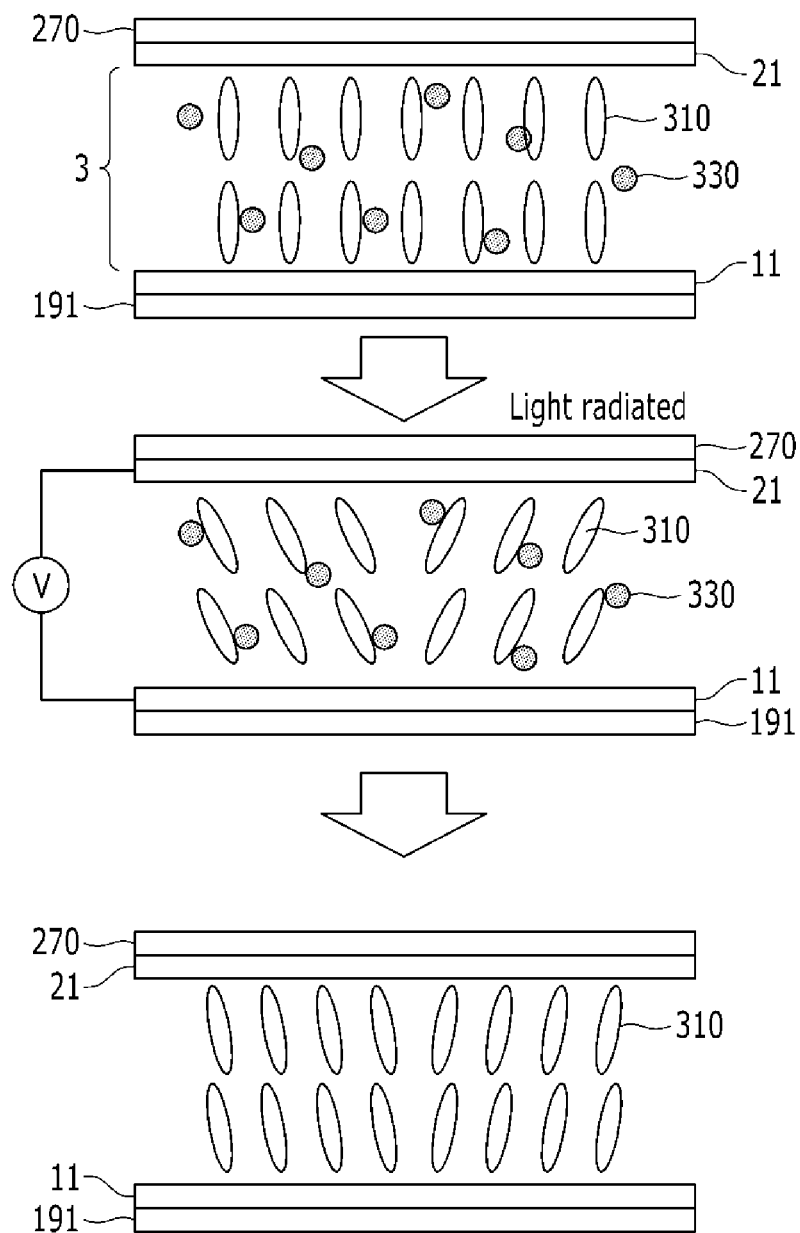
FIG. 9 is a diagram illustrating a process of applying pretilt to liquid crystal molecules, using prepolymer that is polymerized by light such as ultraviolet rays.

FIG. 3 is an equivalent circuit diagram of one pixel of a liquid crystal display according to an exemplary embodiment of the present invention, FIG. 4 is a top plan view of one pixel of a liquid crystal display according to an exemplary embodiment of the present invention, and FIG. 5 is a cross-sectional view of a liquid crystal display according to an exemplary embodiment of the present invention, taken along lines V-V', V'-V'', and V''-V''' of FIG. 4. FIG. 6 is a top plan view illustrating a first cutout of a common electrode and a pixel electrode of one pixel of a liquid crystal display according to an exemplary embodiment of the present invention, FIG. 7 is a top plan view illustrating only the pixel electrode in FIG. 6, and FIG. 8 is a top plan view illustrating only the first cutout of the common electrode in FIG. 6. FIG. 9 is a diagram illustrating a process of applying pretilt to liquid crystal molecules, using prepolymer that is polymerized by light such as ultraviolet rays.

Referring to FIGS. 1 to 3, the liquid crystal display according to an exemplary embodiment of the present invention includes a plurality of signal lines 121, 171, and 131 and a plurality of pixels PX connected to the signal lines.

The signal lines 121, 171, and 131 include a gate line 121 transmitting a gate signal (also called a "scanning signal"), a data line 171 transmitting a data voltage, and a storage electrode line 131 receiving a constant voltage.

A first switching element Qh and a second switching element Ql are connected to the same gate line 121 and the same data line 171. A third switching element Qc is connected to the same gate line 121 as the first and second switching elements Qh and Ql. The third switching element Qc is also connected to the second switching element Ql and the storage electrode line 131. The first to third switching elements Qh, Ql, and Qc may be thin film transistors.

The pixels PX each include two subpixels PXa and PXb. A first liquid crystal capacitor Clch connected to the first switching element Qh is disposed in the first subpixel PXa, and a second liquid crystal capacitor Clcl connected to the second switching element Ql is disposed in the second subpixel PXb.

The first terminal of the first switching element Qh is connected to the gate line 121, the second terminal of the first switching element Qh is connected to the data line 171, and the third terminal of the first switching element Qh is connected to the first liquid crystal capacitor Clch. In particular, the third terminal of the first switching element Qh is connected to the first subpixel electrode 191h constituting the first liquid crystal capacitor Clch.

The first terminal of the second switching element Ql is connected to the gate line 121, the second terminal of the second switching element Ql is electrical connected to the data line 171, and the third terminal of the second switching element Ql is connected to the second liquid crystal capacitor Clcl. In particular, the third terminal of the second switching element Ql is connected to the second subpixel electrode 191l constituting the second liquid crystal capacitor Clcl.

The first terminal of the third switching element Qc is connected to the gate line 121, the second terminal is connected to the storage electrode line 131, and the third terminal is connected to the third terminal of the second switching element Ql.

According an exemplary embodiment of the present invention, when a gate-on voltage is applied to the gate line 121, all of the first to third switching elements Qh, Ql, and Qc connected thereto are turned on and the first liquid crystal capacitor Clch and the second liquid crystal capacitor Clcl are charged with the data voltage transmitted through the data line 171.

Since the third switching element Qc is turned on, the data voltage transmitted to the second subpixel PXb through the data line 171 is divided through the third switching element Qc connected in series with the second switching element Ql. The voltage is divided in accordance with the size of the channels of the second switching element Ql and the third switching element Qc. Accordingly, even if the data voltages transmitted to the first subpixel PXa and the second subpixel PXb through the data line 171 are the same, the voltages charged in the first liquid crystal capacitor Clch and the second liquid crystal capacitor Clcl are different. That is, the voltage charged in the second liquid crystal capacitor Clcl is lower than the voltage charged in the first liquid crystal capacitor Clch. Therefore, it is possible to improve side visibility by making the voltage to be charged in the first and second subpixels PXa and PXb in the same pixel PX different.

Hereinafter, the structure of one pixel of the liquid crystal display according to an exemplary embodiment of the present invention will be described with reference to FIGS. 4 and 5. The liquid crystal display according to an exemplary embodiment of the present invention includes a lower panel 100 and an upper panel 200, which face each other, and a liquid crystal layer 3 between the two panels 100 and 200.

First, the lower panel 100 will be described.

A gate line 121 and a storage electrode line 131 are formed in one direction on a first substrate 110 made of, for example, transparent glass or plastic.

The gate line 121 extends in a substantially horizontal direction and may transmit a gate signal. A first gate electrode 124h and a second gate electrode 124l protrude from the gate line 121 and connect with each other. Further, a third gate electrode 124c protrudes from the gate line 121 and is spaced apart from the first gate electrode 124h and the second gate electrode 124l. The first to third gate electrodes 124h, 124l, and 124c are connected to the same gate line 121 and, therefore, receive the same gate signal.

The storage electrode line 131 may extend in the same direction as that of the gate line 121. A constant voltage is applied to the storage electrode line 131. A storage electrode 133 and a protrusion 134 protrude from the storage electrode line 131. The storage electrode 133 may surround a pixel electrode 191 and the protrusion 134 protrudes toward the gate line 121.

A gate insulating layer 140 is disposed on the gate line 121, the first to third gate lines 124h, 124l, and 124c, the storage electrode line 131, the storage electrode 133, and the protrusion 134. The gate insulating layer 140 may be made of a suitable inorganic material, such as silicon nitride (SiNx) and silicon oxide (SiOx). Further, the gate insulating layer 140 may be a single layer or a multilayer.

A first semiconductor layer 154h, a second semiconductor layer 154l, and a third semiconductor layer 154c are disposed on the gate insulating layer 140. The first semiconductor layer 154h may be disposed on the first gate electrode

124*h*, the second semiconductor layer 154*l* may be disposed on the second gate electrode 124*l*, and the third semiconductor layer 154*c* may be disposed on the third gate electrode 124*c*.

A data line 171, a first source electrode 173*h*, a first drain electrode 175*h*, a second source electrode 173*l*, a second drain electrode 175*l*, a third source electrode 173*c*, and a third drain electrode 175*c* are disposed on the first to third semiconductor layers 154*h*, 154*l*, and 154*c* and the gate insulating layer 140.

The first to third semiconductor layers 154*h*, 154*l*, and 154*c* may also be formed under the data line 171. Further, the second semiconductor layer 154*l* and the third semiconductor layer 154*c* may be connected each other. However, the present invention is not limited thereto. In another embodiment, the first to third semiconductor layer 154*h*, 154*l*, and 154*c* may be formed on only the first to third gate electrode 124*h*, 124*l*, and 124*c*, and the second semiconductor layer 154*l* and the third semiconductor layer 154*c* may be separated from each other.

The data line 171 transmits a data voltage and substantially vertically crosses the gate line 121.

The first source electrode 173*h* protrudes over the first gate electrode 124*h* from the data line 171. The first source electrode 173*h* may have a C-shape, bending over the first gate electrode 124*h*.

The first drain electrode 175*h* may be disposed apart from the first source electrode 173*h* over the first gate electrode 124*h*. A channel may be formed in the first semiconductor layer 154*h* at the exposed portion between the first source electrode 173*h* and the first drain electrode 175*h* spaced from each other.

The second source electrode 173*l* may protrude over the second gate electrode 124*l* from the data line 171. The second source electrode 173*l* may have a C-shape, bending over the second gate electrode 124*l*.

The second drain electrode 175*l* may be disposed apart from the second source electrode 173*l* over the second gate electrode 124*l*. A channel may be formed in the second semiconductor layer 154*l* at the exposed portion between the second source electrode 173*l* and the second drain electrode 175*l* spaced apart from each other.

The third source electrode 173*c* may be disposed on the protrusion 134 and the third gate electrode 124*c*. One end of the third source electrode 173*c* may have a C-shape bending over the third gate electrode 124*c*.

The third drain electrode 175*c* may be connected to the second drain electrode 175*l* over the third gate electrode 124*c*, and spaced apart from the third source electrode 173*c*. A channel may be formed in the third semiconductor layer 154*c* at the exposed portion between the third source electrode 173*c* and the third drain electrode 175*c* spaced apart from each other.

The first gate electrode 124*h*, the first semiconductor layer 154*h*, the first source electrode 173*h*, and the first drain electrode 175*h* described above constitute a first switching element. Further, the second gate electrode 124*l*, the second semiconductor layer 154*l*, the second source electrode 173*l*, and the second drain electrode 175*l* constitute a second switching element. The third gate electrode 124*c*, the third semiconductor layer 154*c*, the third source electrode 173*c*, and the third drain electrode 175*c* constitute a third switching element.

A passivation layer 180 may be formed on the data line 171, the first to the third source electrodes 173*h*, 173*l*, and 173*c*, and the first to the third drain electrodes 175*h*, 175*l*, and 175*c*. The passivation layer 180 may be made of an organic insulating material or an inorganic insulating material and may be a single layer or multilayer. The organic insulating material may be, for example, a color filter.

In the passivation layer 180, a first contact hole 185*h* is formed, exposing at least a portion of the first drain electrode 175*h*. A second contact hole 185*l* is formed in the passivation layer 180, exposing at least a portion of the second drain electrode 175*l*. A third contact hole 185*c* is formed in the passivation layer 180, exposing at least a portion of the protrusion 134 and the third source electrode 173*c*.

The pixel electrode 191 including the first subpixel electrode 191*h* and the second subpixel electrode 191*l* may be disposed on the passivation layer 180. Further, bridge electrode 195 may be further disposed on the passivation layer 180.

The first subpixel electrode 191*h* is connected with the first drain electrode 175*h* through a first contact hole 185*h* and the second subpixel electrode 191*l* is connected with the second drain electrode 175*l* through a second contact hole 185*l*. The bridge electrode 195 connects the protrusion 134 and the third source electrode 173*c* through a third contact hole 185*c*. That is, the third source electrode 173*c* is connected to the storage electrode line 131 and receives a constant voltage.

The first subpixel electrode 191*h* and the second subpixel electrode 191*l* receive a data voltage from the first drain electrode 175*h* and the second drain electrode 175*l*, respectively. Some of the data voltage applied to the second drain electrode 175*l* may be divided through the third source electrode 173*c*, so that the magnitude of the second subpixel voltage applied to the second subpixel electrode 191*l* is smaller than the magnitude of the first subpixel voltage applied to the first subpixel electrode 191*h*. This corresponds to when the data voltage applied to the first subpixel electrode 191*h* and second subpixel electrode 191*l* has a positive polarity (+). However, when the data voltage applied to the first subpixel electrode 191*h* and second subpixel electrode 191*l* has a negative polarity (−), the first subpixel voltage applied to the first subpixel electrode 191*h* is smaller than the second subpixel voltage applied to the second subpixel electrode 191*l*.

The second subpixel voltage applied to the second subpixel electrode 191*l* may be about 0.9 or less times the first subpixel voltage applied to the first subpixel electrode 191*h*. For example, the second subpixel voltage may be about 0.75 or about 0.85 times the first subpixel voltage.

The first subpixel electrode 191*h* and the second subpixel electrode 191*l* receiving the data voltage generate an electric field together with the common electrode 270 of the upper panel 200, thereby controlling the direction of the liquid crystal molecules 310 in the liquid crystal layer 3 between the two electrodes 191 and 270. The luminance of light passing through the liquid crystal layer 3 depends on the direction of the liquid crystal molecules 310, as described above.

The first subpixel electrode 191*h* and the common electrode 270 constitute the first liquid crystal capacitor Clch together with the liquid crystal layer 3 therebetween, and the second subpixel electrode 191*l* and the common electrode 270 constitute the second liquid crystal capacitor Clcl together with the liquid crystal layer 3 therebetween. Thus, the applied voltage is kept even after the first and second thin film transistors are turned off.

The first and second subpixel electrodes 191*h* and 191*l* may constitute a first and second storage capacitor by overlapping the storage electrode line 131 and the storage electrode 133. The first and second storage capacitors can enhance the ability of keeping a voltage of the first and second liquid crystal capacitors Clch and Clcl, respectively.

The first subpixel electrode 191h may have a substantially rhomboid shape. The second subpixel electrode 191l may surround the first subpixel electrode 191h. The pixel electrode 191 may further have a second cutout 91 arranged close to and along at least one of the edges of the second subpixel electrode 191l and a third cutout 93 spacing the first subpixel electrode 191h and the second subpixel electrode 191l apart. The detailed shapes of the first and second subpixel electrodes 191h and 191l will be described below with reference to FIGS. 6 to 8.

A first alignment layer 11 may be disposed on the pixel electrode 191 and the passivation layer 180. The first alignment layer 11 may be a vertical alignment layer and may be photo-aligned using a photopolymerizing material.

Next, the upper panel 200 will be described.

A light blocking member 220 is disposed on a second substrate 210. The light blocking member 220 prevents light leakage, and may be implemented in a black matrix. The light blocking member 220 may be disposed at the edge of the pixel area PX and over the first to third thin film transistors.

A plurality of color filters 230 are disposed on the second substrate 210. Most part of the color filter 230 is in the region surrounded by the light blocking member 220 and may extend along the line of the pixel electrodes 191. The edge of the color filter 230 may partially overlap the light blocking member 220. The color filters 230 may exhibit one of three primary colors of red, green, and blue. However, the color filter may exhibit at least one of cyan, magenta, yellow, and white series colors, and is therefore not limited to the three primary colors of red, green, and blue.

At least one of the light blocking member 220 and the color filter 230 may be formed on the first substrate 110.

An overcoat 240 may be formed on the light blocking member 220 and the color filter 230.

A common electrode 270 may be disposed on the overcoat 240. The common electrode 270 has a first cutout 271 having a cross shape. The detailed shape of the first cutout 271 will be described below with reference to FIGS. 6 to 8.

A second alignment layer 21 is disposed on the common electrode 270. The second alignment layer 21 may be a vertical alignment layer and may be an alignment layer photo-aligned using a photopolymerizing material.

A polarizer (not illustrated) may be disposed on the outer sides of the lower panel 100 and the upper panel 200, the polarization axes of two polarizers may cross at right angles, and one of the polarization axes may be substantially parallel with the gate line 121. If he display is a reflective type display, one of the two polarizers may not be provided.

Hereinafter, the pixel electrode and the common electrode of the liquid crystal display according to an exemplary embodiment of the present invention will be described with reference to FIGS. 6 to 8.

As illustrated in FIGS. 6 and 7, the pixel electrode 191 includes the first subpixel electrode 191h and the second subpixel electrode 191l, the second cutout 91 is disposed at the edge of the second subpixel electrode 191l, and the third cutout 93 is disposed between the first subpixel electrode 191h and the second subpixel electrode 191l.

The first subpixel electrode 191h may be formed in a rhomboid shape. In this configuration, the first subpixel electrodes 191h may be formed in the shape of three rhombuses and connected.

The second subpixel electrode 191l may be formed in a rectangular shape surrounding an empty rhomboid shape. In this configuration, the second subpixel electrode 191l may be formed in the shape of three connected rectangles and the center of each of the rectangles may be an empty rhomboid shape. The first subpixel electrode 191h may be positioned at or near the center.

The second cutout 91 may be positioned at the corners of the rectangular second subpixel electrode 191l. The second cutout 91 may be formed at only a portion of the four corners or may be formed throughout the four corners. In this configuration, as illustrated in the figures, the second cutout 91 may be separated at the centers of the four corners. Alternatively, unlike those illustrated in the figures, the second cutout 91 may be separated at the ends of the four corners. The second cutout 91 may be, as illustrated in the figures, formed in an L-shape or a T-shape, or in another embodiment, in an I-shape.

The distance W1 from the edge of the second subpixel electrode 191l to the second cutout 91 may be three or less times the distance between the first substrate 110 and the second substrate 210, that is, the cell-gap.

The width W2 of the second cutout 91 may be three or less times the distance between the first substrate 110 and the second substrate 210, that is, the cell-gap.

The third cutout 93 may be formed in a rhomboid shape between the first subpixel electrode 191h and the second subpixel electrode 191l, thereby spacing the first subpixel electrode 191h and the second subpixel electrode 191l apart. When the first subpixel electrode 191h is in the shape of three rhombuses, the third cutout 93 may be formed in the shape of three connected rhombuses. The third cutout 93 may be connected with the second cutout 91.

The width of the third cutout 93 depends on the distance between the first subpixel electrode 191h and the second subpixel electrode 191l. The width of the third cutout 93 may be designed to change in accordance with the distance between the first substrate 110 and the second substrate 210, that is, the cell-gap. When the distance between the first substrate 110 and the second substrate 210 is in the range of about 2.8 μm to about 3.2 μm, the width of the third cutout 93 may be designed in the range of about 1 μm to about 8 μm.

As illustrated in FIGS. 6 and 8, the common electrode 270 has the cross-shaped first cutout 271. The first cutout 271 may be formed in the shape of three connected crosses. Since the common electrode 271 is disposed in other regions besides the first cutout 271, the reference number of the common electrode 270 is not provided in the top plane view.

The first cutout 271 has a first part 271a extending horizontally, and a second part 271b extending vertically. When the first cutout 271 is in the shape of three crosses, three first parts 271a and three second parts 271b may cross each other and the second parts 271b may be connected each other.

The pixel electrode 191h and the common electrode 270 overlap each other, and an electric field is formed between the electrodes. The overlapping shape will be described with reference to FIG. 6.

The first cutout 271 of the common electrode 270 overlaps the two diagonals crossing each other of the rhomboid shape of the first subpixel electrode 191h. That is, the first part 271a of the first cutout 271 may overlap the horizontal diagonal and the second part 271b of the first cutout 271 may overlap the vertical diagonal.

The pixel electrode 191 is in the shape of a series of three rectangles and the common electrode 270 may be in the shape of a series of three crosses. One region made by one rectangle of the pixel electrode 191 and one cross of the common electrode 270 is described hereafter. The tilt direction of the liquid crystal molecules 310 is divided into four directions by a fringe field produced by the first cutout 271 of the common electrode 270 and the second cutout 91 of the pixel electrode 191. Accordingly, one basic region is divided into four sub-regions.

The amount of control of the liquid crystal at the portion from the center of the first cutout 271 of the common electrode 270 to the four corners of the second subpixel electrode 191*l* is relatively smaller than other portions. In the liquid crystal display according to an exemplary embodiment of the present invention, as the third cutout 93 is formed between the first subpixel electrode 191*h* and the second subpixel electrode 191*l*, a fringe field is additionally produced, so that the portion with relatively small liquid crystal control ability can be complemented. That is, in the liquid crystal display according to an exemplary embodiment of the present invention, texture control can be improved by producing an additional fringe field.

Hereinafter, a method of early alignment for pretilt of the liquid crystal molecules 310 will be described with reference to FIG. 9.

A prepolymer 330 such as a monomer is cured by light-driven polymerization using light, such as the ultraviolet rays. Prepolymer 130 is injected first with a liquid crystal material into between the two panels 100 and 200. The prepolymer 330 may be reactive mesogen that generates polymerization by light such as the ultraviolet rays.

An electric field is produced in the liquid crystal layer 3 between two field generating electrodes by applying a data voltage to the pixel electrode 191 and a common voltage to the common electrode 270. Then, the liquid crystal molecules 310 in the liquid crystal layer 3 are tilted substantially in parallel to the direction to the center portion of the first cutout 271 of the cross-shaped common electrode 270 from the four corners of the pixel electrode 191. The liquid crystal molecules 310 are tilted by a fringe field caused by the first cutout 271 of the common electrode 270 and the second cutout 91 of the pixel electrode 191, in response to the electric field. Thus, total tilt directions of the liquid crystal molecules 310 are four directions in one basic region. That is, the liquid crystal molecules 310 positioned in the four sub-regions constituting one basic region are arranged to have different pretilts.

Although it was described that the prepolymer 330 is positioned between the liquid crystal molecules 310, the present invention is not limited thereto. The prepolymer 330 may be contained not only in the liquid crystal layer 3, but in the first and second alignment layers 11 and 21. That is, the prepolymer 330 may include with an alignment material on the first substrate 110 and the second substrate 210, respectively, when the first alignment layer 11 and the second alignment layer 21 are formed. The prepolymer 330 may be reactive mesogen that generates polymerization by light, such as the ultraviolet rays. The first and second alignment layers 11 and 21, which are positioned in the four sub-regions constituting one basic region, are given to have different pretilts.

Next, a liquid crystal display according to an exemplary embodiment of the present invention will be described with reference to FIG. 10.

Figure 10:
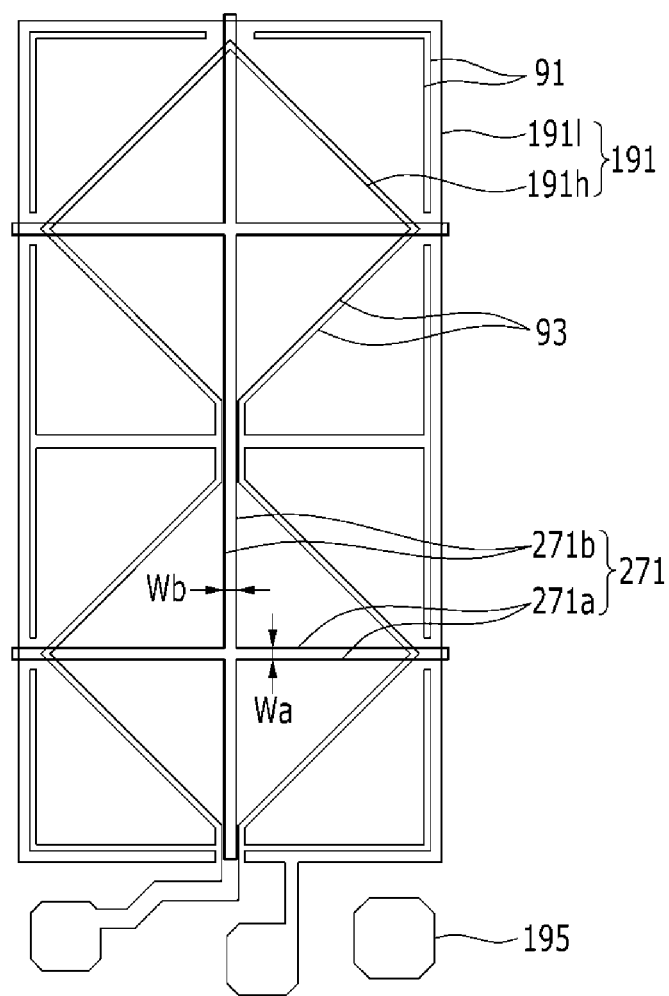
FIG. 10 is a top plan view illustrating a pixel electrode and a first cutout of a common electrode in one pixel a liquid crystal display according to an exemplary embodiment of the present invention.

The liquid crystal display according to an exemplary embodiment of the present invention illustrated in FIG. 10 is the same in many parts as the liquid crystal display according to an exemplary embodiment of the present invention illustrated in FIGS. 1 to 9, so the same configuration is not described. The present exemplary embodiment is different from the previous exemplary embodiment in that the first subpixel electrode is in the shape of two rhombuses, and will be described in more detail hereafter.

FIG. 10 is a top plan view illustrating a pixel electrode and a first cutout of a common electrode in one pixel of a liquid crystal display according to an exemplary embodiment of the present invention.

In the previous exemplary embodiment, the first subpixel electrode 191*h* has the shape of three connected rhombuses and the second subpixel electrode 191*l* is in the shape of three rectangles with rhombus-shaped empty center.

However, in the present exemplary embodiment, the first subpixel electrode 191*h* is in the shape of two connected rhombuses. Further, the second subpixel electrode 191*l* may be formed in the shape of two connected rectangles and the center of each of the rectangles is an empty in a rhomboid shape. The first subpixel electrode 191*h* is positioned at or near the center.

The second cutout 91 may be disposed close to and along at least one of the edges of the second subpixel electrode 191*l* and the third cutout 93 is formed in a rhomboid shape between the first subpixel electrode 191*h* and the second subpixel electrode 191*l*, thereby spacing first subpixel electrode 191*h* and the second subpixel electrode 191*l* apart. The third cutout 93 may be implemented in the shape of two connected rhombuses.

A common electrode has a first cutout 271 having a cross shape. More specifically, the first cutout 271 is in the shape of two connected crosses.

The first cutout 271 of the common electrode overlaps the two diagonals crossing each other in the rhombus shape of the first subpixel electrode 191*h*. In the present exemplary embodiment, two basic regions, which are each defined by one rectangle of the pixel electrode 191 and one cross of the common electrode, are formed in each pixel.

Although three basic regions are formed in each pixel in the description of the previous exemplary embodiment and two basic regions are disposed in each pixel in the present exemplary embodiment, the present invention is not limited thereto. One basic region may be disposed in each pixel, or four or more basic regions may be disposed in each pixel. The number of the basic region may depend on the design of shape and size of the pixels. Further, the horizontal and vertical lengths of the pixel electrode 191 and the horizontal and vertical lengths of the first cutout 271 of the common electrode may be appropriately changed in accordance with the number of the basic regions included in one pixel.

Next, a liquid crystal display according to an exemplary embodiment of the present invention will be described with reference to FIG. 11.

Figure 11:
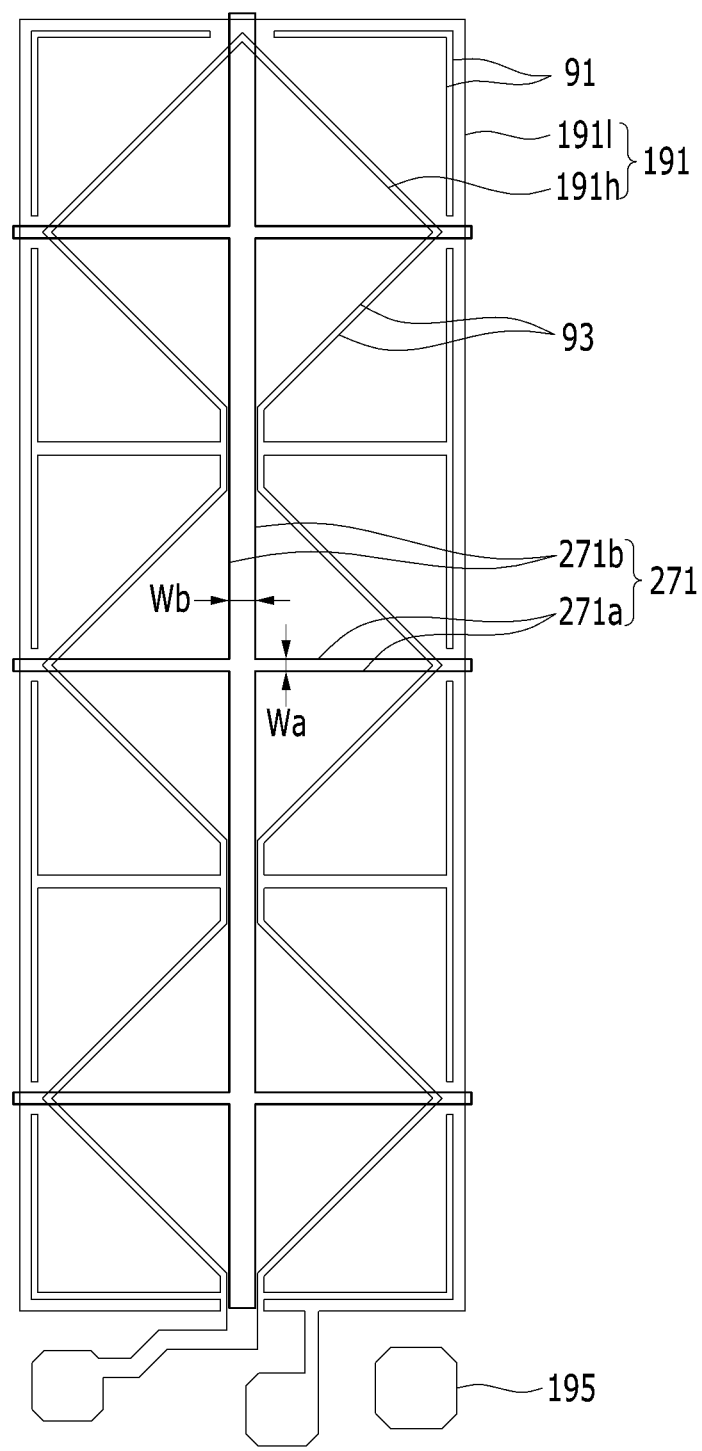
FIG. 11 is a top plan view illustrating a pixel electrode and a first cutout of a common electrode in one pixel a liquid crystal display according to an exemplary embodiment of the present invention.

The liquid crystal display according to an exemplary embodiment of the present invention illustrated in FIG. 11 is the same in many parts as the liquid crystal display according to an exemplary embodiment of the present invention illustrated in FIGS. 1 to 9, so the same configuration is not described. The present exemplary embodiment is different from the previous exemplary embodiments in that the widths of the first part and the second part of the common electrode are different, and will be described in more detail hereafter.

FIG. 11 is a top plan view illustrating a pixel electrode and a first cutout of a common electrode in one pixel of a liquid crystal display according to an exemplary embodiment of the present invention.

A common electrode has a first cutout 271 having a cross shape.

The first cutout 271 has a first part 271*a* extending horizontally and a second part 271*b* extending vertically.

When the first cutout 271 is implemented in the shape of three crosses, three first parts 271a and three second parts 271b may cross each other and the second parts 271b may be connected each other.

The widths of the first part 271a and the second part 271b were the same in the previous exemplary embodiments.

However, the width Wa of the first part 271a and the width Wb of the second part 271b are different in the present exemplary embodiment. The width Wb of the second part 271b is larger than the width Wa of the first part 271a. For example, the width Wa of the first part 271a may be about 5.0 µm and the width Wb of the second part 271b may be about 3.5 µm.

As the width Wb of the second part 271b of the first cutout 271 of the common electrode is larger than the width Wa of the first part 271a, it is possible to reduce the angle made by the liquid crystal molecules and the first part 271a by enhancing the horizontal fringe field component. Therefore, it is possible to improve the horizontal side visibility.

Next, a liquid crystal display according to an exemplary embodiment of the present invention will be described with reference to FIG. 12.

Figure 12:
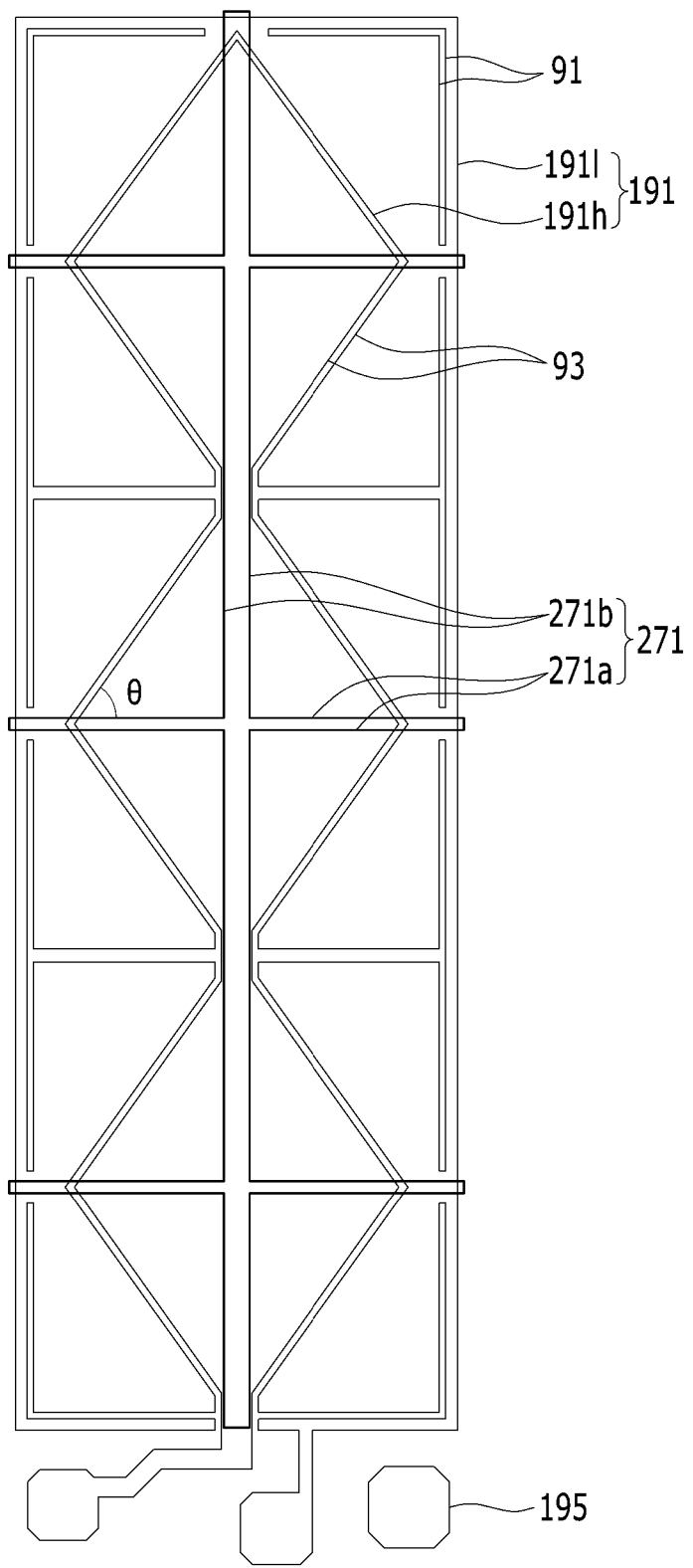
FIG. 12 is a top plan view illustrating a pixel electrode and a first cutout of a common electrode in one pixel a liquid crystal display according to an exemplary embodiment of the present invention.

The liquid crystal display according to an exemplary embodiment of the present invention illustrated in FIG. 12 is the same in many parts as the liquid crystal display according to an exemplary embodiment of the present invention illustrated in FIGS. 1 to 9, so the same configuration is not described. The present invention is different from the previous exemplary embodiments in that the angle made by the third cutout of the pixel electrode and the first part of the first cutout of the common electrode is about 45 degrees or more, and will be described in detail below.

FIG. 12 is a top plan view illustrating a pixel electrode and a first cutout of a common electrode in one pixel a liquid crystal display according to an exemplary embodiment of the present invention.

The angle made by the third cutout 93 of the pixel electrode 191 and the first part 271a of the first cutout 271 of the common electrode was about 45 degrees in the previous exemplary embodiments.

However, in the present exemplary embodiment, the angle made by the third cutout 93 of the pixel electrode 191 and the first part 271a of the first cutout 271 of the common electrode is about 45 degrees or more. The angle made by the third cutout 93 of the pixel electrode 191 and the first part 271a of the first cutout 271 of the common electrode may be in the range of about 45 to about 52 degrees.

The third cutout 83 of the pixel electrode 191 may be in a rhomboid shape, in which the vertical diagonal may be made longer than the horizontal diagonal, in two diagonals of the rhombus. The larger the difference between the length of the vertical diagonal and the length of the horizontal diagonal, the larger the angle made by the third cutout 93 of the pixel electrode 191 and the first part 271a of the first cutout 271 of the common electrode becomes.

As the angle made by the third cutout 93 of the pixel electrode 191 and the first part 271a of the first cutout 271 of the common electrode is about 45 degrees or more, it is possible to reduce the angle made by the liquid crystal molecules and the first part 271a by enhancing the horizontal fringe field component. This configuration may improve the horizontal side visibility.

Next, a liquid crystal display according to an exemplary embodiment of the present invention will be described with reference to FIGS. 13 to 15.

Figure 13:
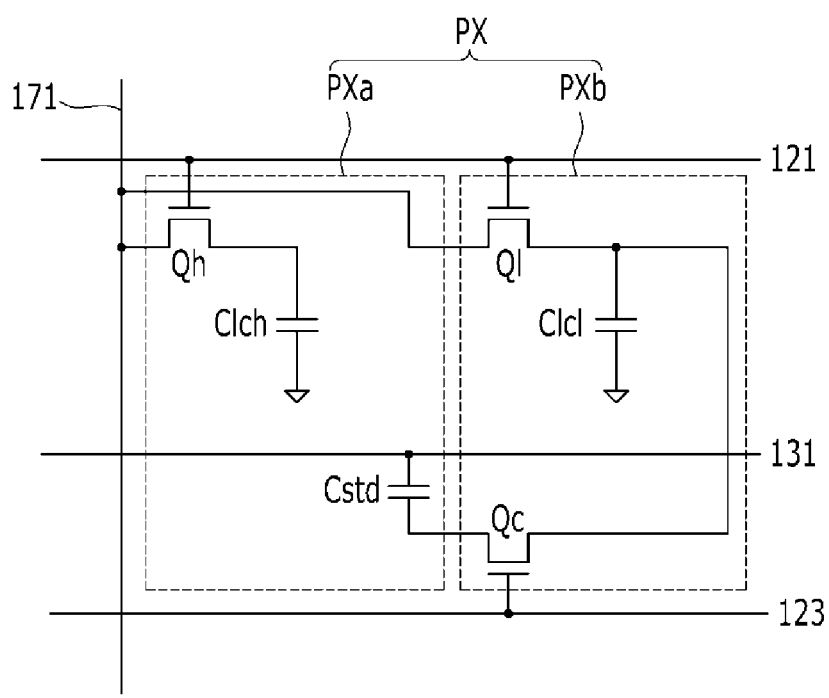
FIG. 13 is an equivalent circuit diagram of one pixel of a liquid crystal display according to an exemplary embodiment of the present invention.
Figure 14:
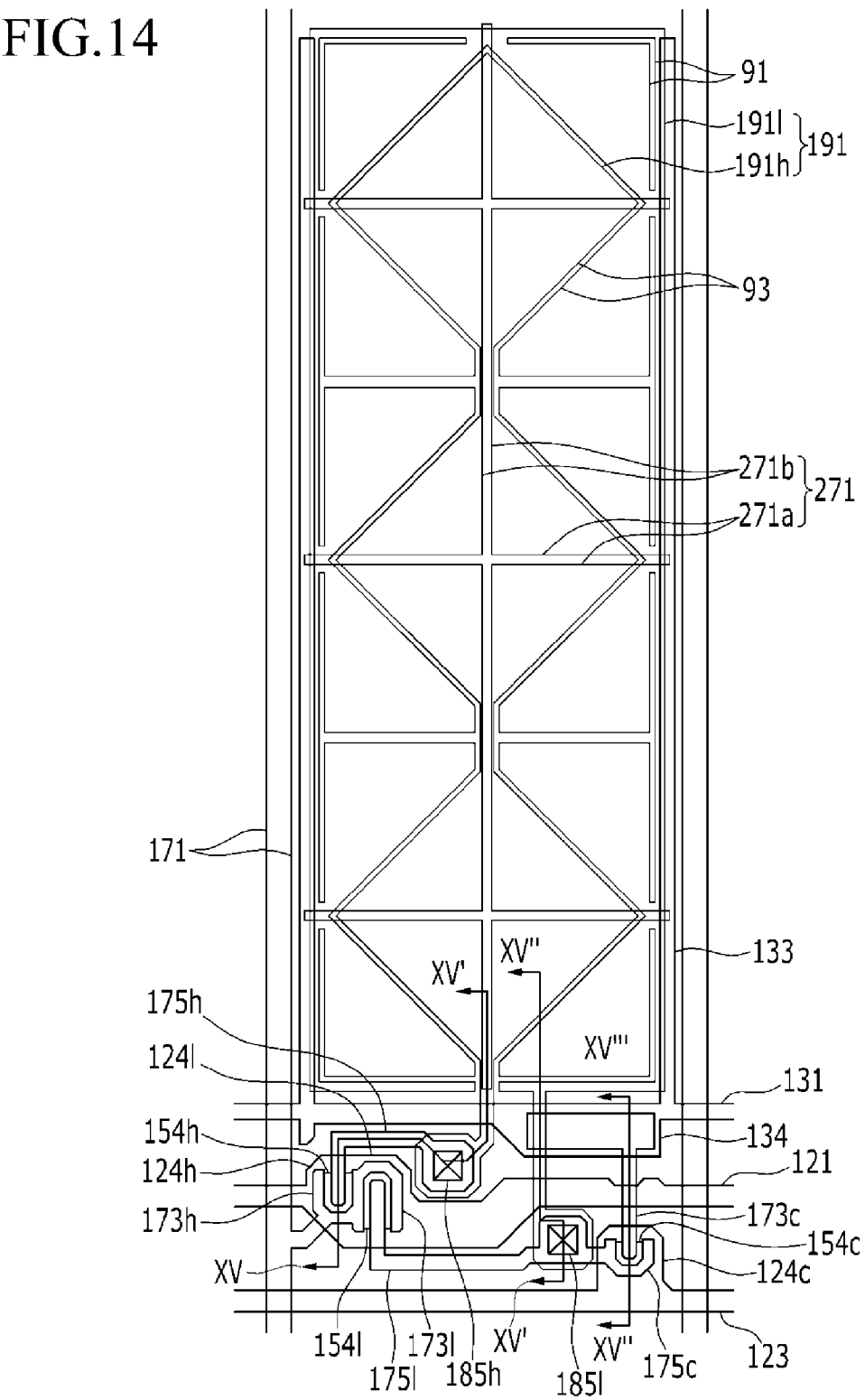
FIG. 14 is a top plan view of one pixel of a liquid crystal display according to an exemplary embodiment of the present invention.
Figure 15:
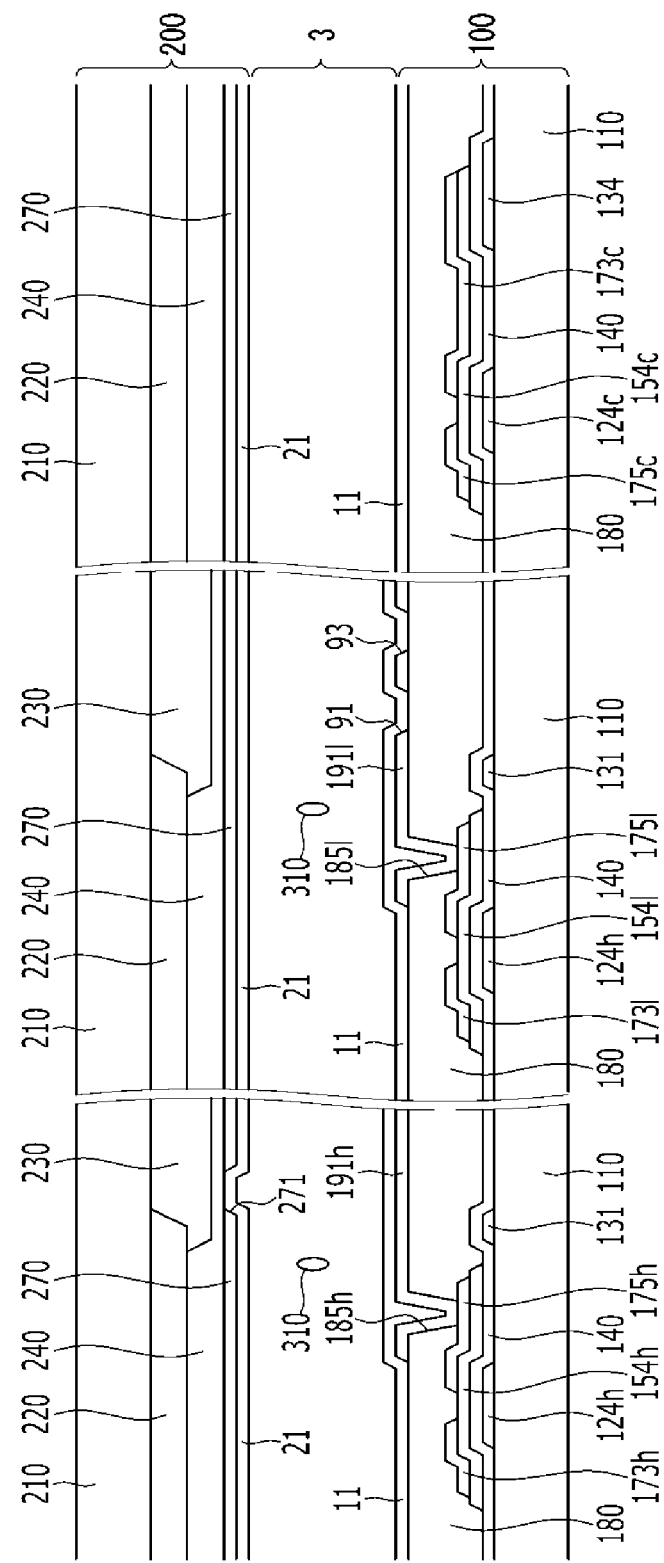
FIG. 15 is a cross-sectional view of a liquid crystal display according to an exemplary embodiment of the present invention, taken along lines XV-XV', XV'-XV", and XV"-XV'" of FIG. 14.

The liquid crystal display according to an exemplary embodiment of the present invention illustrated in FIGS. 13 to 15 is the same in many parts as the liquid crystal display according to an exemplary embodiment of the present invention illustrated in FIGS. 1 to 9, so the same configuration is not described. The present exemplary embodiment is different from the previous exemplary embodiment in that the third thin film transistor is connected to a gate line different from those of the first and second thin film transistors and a step-down capacitor is disposed between the third thin film transistor and the storage electrode line, and will be described in more detail hereafter.

FIG. 13 is an equivalent circuit diagram of one pixel of a liquid crystal display according to an exemplary embodiment of the present invention, FIG. 14 is a top plan view of one pixel of a liquid crystal display according to an exemplary embodiment of the present invention, and FIG. 15 is a cross-sectional view of a liquid crystal display according to an exemplary embodiment of the present invention, taken along lines XV-XV', XV'-XV'', and XV''-XV''' of FIG. 14.

The liquid crystal display according to an exemplary embodiment of the present invention includes a plurality of signal lines 121, 123, 131, and 171 and a plurality of pixels PX connected to the signal lines.

The signal lines 121, 123, 131, and 171 include a gate line 121 and a step-down gate line 123 which transmit a gate signal, a data line 171 transmitting a data voltage, and a storage electrode line 131 receiving a constant voltage.

A first switching element Qh and a second switching element Ql are connected to the same gate line 121 and the same data line 171. A third switching element Qc is connected to the step-down gate line 123.

The first and second switching elements Qh and Ql are connected to the gate line 121 and the data line 171, respectively, and the third switching element Qc is connected to the step-down gate line 123.

The pixels PX each include two subpixels PXa and PXb. A first liquid crystal capacitor Clch connected to the first switching element Qh is formed in the first subpixel Pxa, and a second liquid crystal capacitor Clcl connected with the second switching element Ql is formed in the second subpixel PXb.

The first terminals of the first and second switching elements Qh and Ql are connected to the gate line 121, the second terminal is connected to the data line 171, and the third terminal is connected to the first and second liquid crystal capacitors Clch and Clcl.

The first terminal of the third switching element Qc is connected to the step-down gate line 123, the second terminal is connected to the second liquid crystal capacitor Clcl, and the third terminal is connected to the step-down capacitor Cstd.

The step-down capacitor Cstd is connected to the third terminal of the third switching element Qc and the storage electrode line 131. The output terminals of the storage electrode line 131 and the third switching element Qc may overlap each other with an insulator disposed therebetween.

According to the operation of the liquid crystal display according to an exemplary embodiment of the present invention, when a gate-on voltage is applied to the gate line 121, the first switching element Qh and the second switching element Ql are turned on and the first liquid crystal capacitor Clch and the second liquid crystal capacitor Clcl are charged with the data voltage transmitted through the data line 171 at the same level.

Thereafter, when a gate-off signal is sent to the gate line 121 and a gate-on voltage is applied to the step-down gate line 123, the first switching element Qh and the second switching element Ql are turned off and the third switching element Qc is turned on. Accordingly, charge moves to the step-down capacitor Cstd from the second liquid crystal capacitor Clcl through the third switching element Qc. Therefore, the charging voltage of the second liquid crystal capacitor Clcl decreases and the step-down capacitor Cstd is charged. The charging voltage of the second liquid crystal capacitor Clcl decreases as much as the capacitance of the step-down capacitor Cstd, and accordingly, the charging voltage of the second liquid crystal capacitor Clcl becomes lower than the charging voltage of the first liquid crystal capacitor Clch. Therefore, it is possible to improve side visibility by making the voltage to be charged in the first and second subpixels PXa and PXb in the same pixel PX different.

Hereinafter, the structure of one pixel of a liquid crystal display according to an exemplary embodiment of the present invention will be described. The liquid crystal display according to an exemplary embodiment of the present invention includes a lower panel 100 and an upper panel 200, which face each other, and a liquid crystal layer 3 between the two panels 100 and 200.

In the lower panel 100, the gate line 121, the step-down gate line 123, the storage electrode line 131 are disposed in a direction on a first substrate 110.

First and second gate electrodes 124h and 124l protrude from the gate line 121 and a third gate line 124c protrudes from the step-down gate line 123.

A storage electrode 133 and a protrusion 134 protrude from the storage electrode line 131.

A gate insulating layer 140 is disposed on the gate line 121, the step-down gate line 123, the storage electrode line 131, the first to third gate electrodes 124h, 124l, and 124c, the storage electrode 133, and the protrusion 134. A first semiconductor layer 154h, a second semiconductor layer 154l and a third semiconductor layer 154c are disposed on the gate insulating layer 140.

A data line 171, a first source electrode 173h, a first drain electrode 175h, a second source electrode 173l, a second drain electrode 175l, a third source electrode 173c, and a third drain electrode 175c are disposed on the first to third semiconductor layers 154h, 154l, and 154c and the gate insulating layer 140.

A passivation layer 180 is disposed on the data line 171, the first to third source electrodes 173h, 173l, and 173c, and the first to third drain electrodes 175h, 175l, and 175c. In the passivation layer 180, a first contact hole 185h exposes at least a portion of the first drain electrode 175h. A second contact hole 185l exposes at least a portion of the second drain electrode 175l.

On the passivation layer 180, a first subpixel electrode 191h is connected to the first drain electrode 175h through the first contact hole 185h and a second subpixel electrode 191l is connected with the second drain electrode 175l through the second contact hole 185l.

Although the third source electrode is connected with the protrusion and receives a constant voltage through the bridge electrode, the third source electrode 173c may just overlaps the protrusion 134 without being connected with the protrusion 134 in the present exemplary embodiment.

The third source electrode 173c and the protrusion 134 overlap each other with the gate insulating layer 140 and the third semiconductor layer 154c therebetween, thereby constituting a step-down capacitor Cstd. The third semiconductor layer 154c may not be provided at the overlap of the third source electrode 173c and the protrusion 134.

The first subpixel electrode 191h and the second subpixel electrode 191l receive a data voltage from the first drain electrode 175h and the second drain electrode 175l, respectively. When a gate-on voltage is applied to the step-down gate line 123, some of the data voltage applied to the second subpixel electrode 191l is divided, such that he magnitude of the second subpixel voltage of the second subpixel electrode 191l decreases so it is under the magnitude of the first subpixel electrode voltage of the first subpixel electrode 191h.

Next, a liquid crystal display according to an exemplary embodiment of the present invention will be described with reference to FIGS. 16 to 18.

Figure 16:
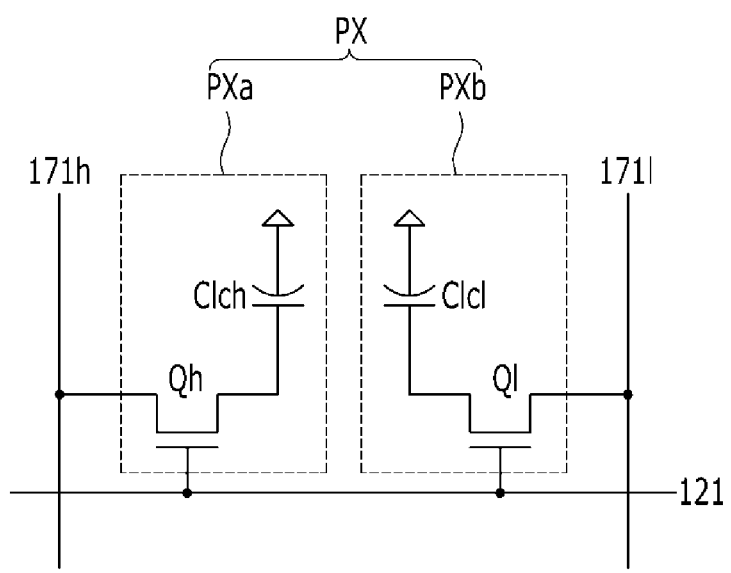
FIG. 16 is an equivalent circuit diagram of one pixel of a liquid crystal display according to an exemplary embodiment of the present invention.
Figure 17:
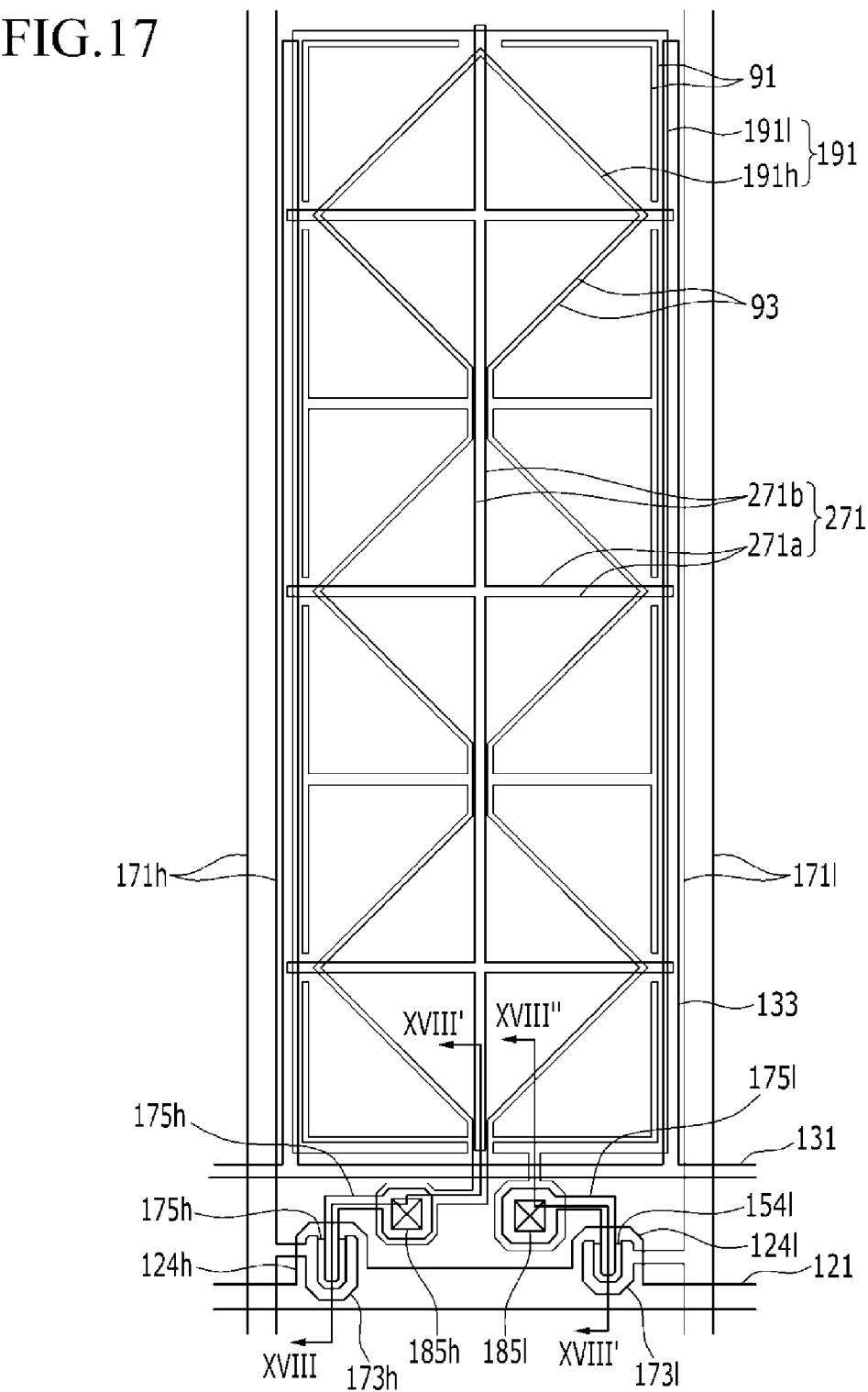
FIG. 17 is a top plan view of one pixel of a liquid crystal display according to an exemplary embodiment of the present invention.
Figure 18:
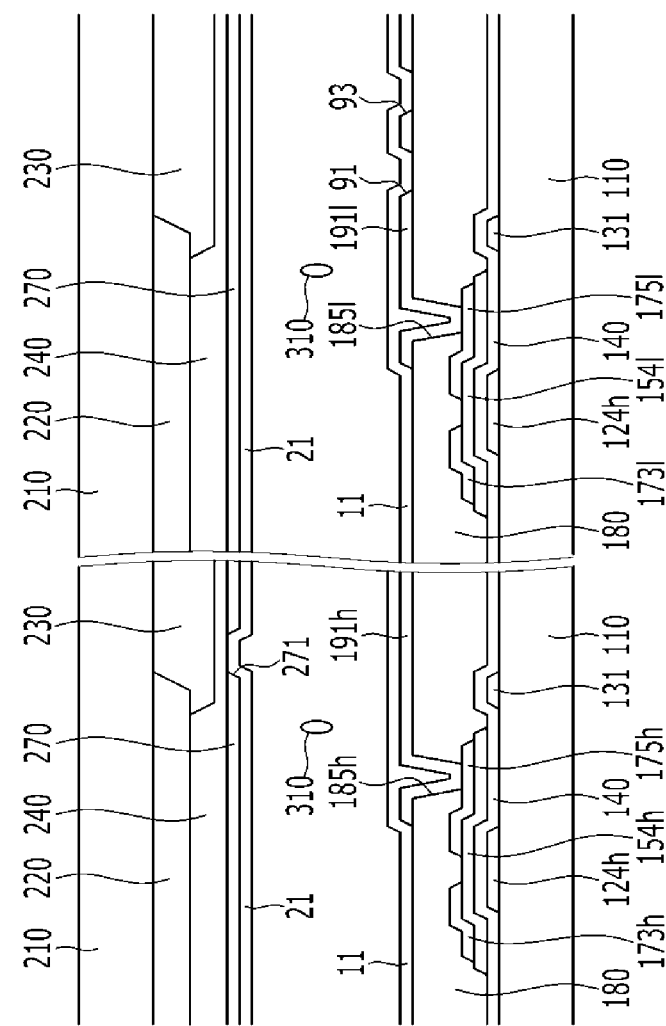
FIG. 18 is a cross-sectional view of a liquid crystal display according to an exemplary embodiment of the present invention, taken along XVIII-XVIII', and XVIII'-XVIII" of FIG. 17.

The liquid crystal display according to an exemplary embodiment of the present invention illustrated in FIGS. 16 to 18 is the same in many parts as the liquid crystal display according to an exemplary embodiment of the present invention illustrated in FIGS. 1 to 9, so the same configuration is not described. The present exemplary embodiment is different from the previous exemplary embodiments in that the first thin film transistor and the second thin film transistor are connected to different data lines, and will be described in more detail hereafter.

FIG. 16 is an equivalent circuit diagram of one pixel of a liquid crystal display according to an exemplary embodiment of the present invention, FIG. 17 is a top plan view of one pixel of a liquid crystal display according to an exemplary embodiment of the present invention, and FIG. 18 is a cross-sectional view of a liquid crystal display taken along XVIII-XVIII', XVIII'-XVIII'', and XVIII''-XVIII''' of FIG. 17.

The liquid crystal display includes a plurality of signal lines 121, 171h, and 171l and a plurality of pixels PX connected to the signal lines.

The signal lines 121, 171h, and 171l include a gate line 121 transmitting a gate signal, and a first data line 171h and a second data line 171l, which transmit different data voltages.

A first switching element Qh is connected to the gate line 121 and the first data line 171h. A second switching element Ql is connected to the gate line 121 and the second data line 171l.

The pixels PX each include two subpixels PXa and PXb. A first liquid crystal capacitor Clch is connected to the first switching element Qh in the first subpixel PXa, and a second liquid crystal capacitor Clcl is connected with the second switching element Ql in the second subpixel PXb.

The first terminal of the first switching element Qh is connected to the gate line 121, the second terminal is connected to the first data line 171h, and the third terminal is connected to a first liquid crystal capacitor Clch.

The first terminal of the second switching element Ql is connected to the gate line 121, the second terminal is connected to the second data line 171l, and the third terminal is connected to a second liquid crystal capacitor Clcl.

When a gate-on voltage is applied to the gate line 121, the first switching element Qh and the second switching element Ql connected thereto are turned on and the first and the second liquid crystal capacitors Clch and Clcl are charged with the different data voltages transmitted through the first and second data lines 171h and 171l. The data voltage transmitted through the second data line 171l is lower than the data voltage transmitted through the first data line 171h. Accordingly, the second liquid crystal capacitor Clcl is charged at a level lower than that of the first liquid crystal capacitor Clch, and accordingly, the side visibility can be improved.

Hereinafter, the structure of one pixel of a liquid crystal display according to an exemplary embodiment of the present invention will be described. The liquid crystal display according to an exemplary embodiment of the present invention includes a lower panel 100 and an upper panel 200, which face each other, and a liquid crystal layer 3 between the two panels 100 and 200.

In the lower panel 100, a gate line 121 is disposed on a first substrate 110.

First and second gate electrodes 124h and 124l protrude from the gate line 121.

A gate insulating layer 140 is disposed on the gate line 121 and the first and second gate electrodes 124h and 124l, and a first semiconductor layer 154h and a second semiconductor layer 154l are disposed on the gate insulating layer 140.

A data line 171, a first source electrode 173h, a first drain electrode 175h, a second source electrode 173l, and a second drain electrode 175l are disposed on the first and second semiconductor layers 154h and 154l and the gate insulating layer 140.

A passivation layer 180 is disposed on the data line 171, the first and second source electrodes 173h and 173l, and the first and second drain electrodes 175h and 175l. In the passivation layer 180, a first contact hole 185h is formed, exposing at least a portion of the first drain electrode 175h. A second contact hole 185l is formed, exposing at least a portion of the second drain electrode 175l.

On the passivation layer 180, a first subpixel electrode 191h is connected with the first drain electrode 175h through the first contact hole 185h. A second subpixel electrode 191l is connected with the second drain electrode 175l through the second contact hole 185l.

Although the voltage applied to the second subpixel electrode 191l was dropped by forming the third switching element in the previous exemplary embodiment, the first subpixel electrode 191h and the second subpixel electrode 191l are charged with different voltages by applying different data voltages through different data lines in the present exemplary embodiment. That is, the first subpixel electrode 191h receives the first data voltage from the first data line 171h and the second subpixel electrode 191l receives the second data voltage from the second data line 171l, in which the second data voltage is lower than the first data voltage. Therefore, the second subpixel voltage of the second subpixel electrode 191l is lower than the first subpixel voltage of the first subpixel electrode 191h.

Although it was described above that the first subpixel voltage of the first subpixel electrode and the second subpixel voltage of the second subpixel electrode are different through various exemplary embodiments, the present invention is not limited thereto. The design of the switching elements and the capacitors for making the first subpixel voltage and the second subpixel voltage different can be changed in various ways, as a person having ordinary skill in the art would appreciate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first substrate and a second substrate facing each other;
   a pixel electrode disposed on the first substrate;
   a common electrode disposed on the second substrate; and
   a liquid crystal layer disposed between the first substrate and the second substrate,
   wherein the common electrode has a first cutout having a cross shape, and
   the pixel electrode comprises a first subpixel electrode having a rhomboid shape, a second subpixel electrode surrounding the first subpixel electrode, a second cutout disposed along at least one edge of the second subpixel electrode, and a third cutout between the first subpixel electrode and the second subpixel electrode.

2. The liquid crystal display of claim 1, wherein the pixel electrode comprises a rectangular shape and the second subpixel electrode comprises a rectangular shape having an empty center in a rhomboid shape.

3. The liquid crystal display of claim 2, wherein the first cutout overlaps two diagonals of the rhombus of the first subpixel electrode.

4. The liquid crystal display of claim 3, wherein
   the first subpixel electrode has a shape of at least two connected rhombuses, and
   the first cutout has a shape of at least two connected crosses.

5. The liquid crystal display of claim 1, wherein the first subpixel electrode is configured to receive a first subpixel voltage, and the second subpixel electrode is configured to receive a second subpixel voltage, the first subpixel voltage having a greater magnitude than the second subpixel voltage.

6. The liquid crystal display of claim 5, wherein the second subpixel voltage is in a range of about 0.9 or less times the first subpixel voltage.

7. The liquid crystal display of claim 6, wherein the second subpixel voltage is in a range of about 0.75 or about 0.85 times the first subpixel voltage.

8. The liquid crystal display of claim 1, wherein the width of the third cutout is in a range of about 1 μm to about 8 μm.

9. The liquid crystal display of claim 8, wherein the distance between the first substrate and the second substrate is in a range of about 2.8 μm to about 3.2 μm.

10. The liquid crystal display of claim 1, wherein the distance between the edge of the second subpixel electrode and the second cutout is three or less times the distance between the first substrate and the second substrate.

11. The liquid crystal display of claim 10, wherein the width of the second cutout is three or less times the distance between the first substrate and the second substrate.

12. The liquid crystal display of claim 1, further comprising:
   a first alignment layer disposed on the first substrate and the pixel electrode; and
   a second alignment layer disposed on the second substrate and the common electrode.

13. The liquid crystal display of claim 12, wherein
   the first alignment layer and the second alignment layer are vertical alignment layers,
   the liquid crystal layer comprises liquid crystal molecules and reactivity mesogen, and
   the liquid crystal molecules are arranged with pretilts.

14. The liquid crystal display of claim 12, wherein the first alignment layer and the second alignment layer comprises an alignment material and reactive mesogen, and the first alignment layer and the second alignment layer have pretilts.

15. The liquid crystal display of claim 1, further comprising:
   a gate line and a data line disposed on the first substrate;
   a storage electrode line disposed on the first substrate and configured to receive a constant voltage;

a first thin film transistor and a second thin film transistor electrically connected to the gate line and the data line; and a third thin film transistor electrically connected to the gate line, the second thin film transistor, and the storage electrode line, wherein the first subpixel electrode is electrically connected to the first thin film transistor, and the second subpixel electrode is electrically connected to the second thin film transistor.

16. The liquid crystal display of claim 1, further comprising:

a gate line, a step-down gate line, and a data line disposed on the first substrate;

a storage electrode line disposed on the first substrate and configured to receive a constant voltage;

a first thin film transistor and a second thin film transistor electrically connected to the gate line and the data line; and a third thin film transistor electrically connected to the step-down gate line, the second thin film transistor, and the storage electrode line, wherein the first subpixel electrode is electrically connected to the first thin film transistor, and the second subpixel electrode is electrically connected to the second thin film transistor.

17. The liquid crystal display of claim 1, further comprising:

a gate line, a first data line, and a second data line disposed on the first substrate;

a first thin film transistor electrically connected to the gate line and the first data line; and a second thin film transistor electrically connected to the gate line and the second data line, wherein the first subpixel electrode is electrically connected to the first thin film transistor, and the second subpixel electrode is electrically connected to the second thin film transistor.

18. The liquid crystal display of claim 1, wherein the first cutout has a first part extending horizontally and a second part extending vertically.

19. The liquid crystal display of claim 18, wherein the width of the second part is the same as or larger than the width of the first part.

20. The liquid crystal display of claim 18, wherein the angle between the third cutout and the first part of the first cutout is in the range of about 45 degrees to about 52 degrees.

* * * * *